US007832494B2

(12) United States Patent
Horn

(10) Patent No.: US 7,832,494 B2
(45) Date of Patent: Nov. 16, 2010

(54) AGRICULTURAL IMPLEMENT WITH FLEXIBLE WING LOCKING SYSTEM

(75) Inventor: Rodney Samuel Horn, Woodridge, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/846,852

(22) Filed: Aug. 29, 2007

(65) Prior Publication Data

US 2009/0056963 A1 Mar. 5, 2009

(51) Int. Cl.
*A01B 49/00* (2006.01)
(52) U.S. Cl. .................. 172/311; 172/456; 172/481
(58) Field of Classification Search ............ 172/126, 172/826, 730, 470, 481, 662, 668, 311, 456; 248/462, 465, 440; 403/11, 12; 92/146, 92/161

See application file for complete search history.

(56) References Cited

U.S. PATENT DOCUMENTS

| 2,018,325 | A |   | 10/1935 | Schnell |          |
|-----------|---|---|---------|---------|----------|
| 2,641,886 | A | * | 6/1953  | Graham  | 172/311  |
| 3,254,919 | A |   | 6/1966  | Birchmeier |       |
| 3,321,028 | A | * | 5/1967  | Groenke | 172/311  |
| 3,662,653 | A |   | 5/1972  | Carlson et al. |   |
| 3,941,194 | A | * | 3/1976  | Orthman | 172/311  |
| 4,046,203 | A | * | 9/1977  | Ward    | 172/456  |
| 4,073,345 | A |   | 2/1978  | Miller  |          |
| 4,206,815 | A | * | 6/1980  | Hatcher | 172/311  |
| 4,318,444 | A | * | 3/1982  | Hake    | 172/456  |
| 4,373,851 | A |   | 2/1983  | Confoey |          |
| 4,529,215 | A |   | 7/1985  | Strand  |          |
| 4,615,397 | A | * | 10/1986 | Hastings | 172/776 |
| 4,634,170 | A |   | 1/1987  | Lach    |          |
| 4,676,321 | A | * | 6/1987  | Friggstad | 172/776 |
| 4,744,548 | A |   | 5/1988  | Hathaway |         |
| 4,766,803 | A | * | 8/1988  | Cartee et al. | 92/13.4 |
| 5,094,583 | A |   | 3/1992  | Bills, Jr. et al. |  |
| 5,358,225 | A |   | 10/1994 | Volpel et al. |    |
| 5,573,070 | A | * | 11/1996 | Meek et al. | 172/131 |
| 5,826,523 | A |   | 10/1998 | Gregor  |          |

(Continued)

FOREIGN PATENT DOCUMENTS

JP          05306099 A      11/1993
JP       2004125160 A       4/2004

OTHER PUBLICATIONS

U.S. Appl. No. 11/846,615, Rodney Samuel Horn.
U.S. Appl. No. 11/846,668, Rodney Samuel Horn.
U.S. Appl. No. 11/955,894, Rodney Samuel Horn.

*Primary Examiner*—Robert E Pezzuto
*Assistant Examiner*—Matthew D Troutman
(74) *Attorney, Agent, or Firm*—Rebecca Henkel

(57) ABSTRACT

A tension member arrangement is disclosed that can be mounted between a central portion of an agricultural implement and a wing. The wing is configured to be raised and lowered by an actuator. The tension member is mounted to support structures on the central portion of the implement and on the wing once the wing is raised, to maintain the wing in the raised position. Stress may then be relieved from the actuator without the wing descending from the raised position. The tension member may be completely removed from the implement or may remain attached and employed only when needed to maintain the wing in the raised position.

20 Claims, 5 Drawing Sheets

U.S. PATENT DOCUMENTS

| | | |
|---|---|---|
| 5,878,679 A | 3/1999 | Gregor et al. |
| 5,947,040 A | 9/1999 | Gregor |
| 5,996,515 A | 12/1999 | Gregor et al. |
| 6,035,942 A * | 3/2000 | Smith et al. .................. 172/311 |
| 6,035,943 A * | 3/2000 | Gerein et al. ................ 172/328 |
| 6,125,775 A * | 10/2000 | Gust ............................ 111/52 |
| 6,148,748 A | 11/2000 | Bardi et al. |
| 6,149,374 A | 11/2000 | Dershem et al. |
| 6,581,530 B1 | 6/2003 | Hall et al. |
| 6,588,351 B1 | 7/2003 | Hall et al. |
| 6,591,766 B2 | 7/2003 | Williames |
| 6,595,148 B2 | 7/2003 | Meyer et al. |
| 6,647,904 B1 * | 11/2003 | Mariman et al. ............... 111/62 |
| 6,684,962 B1 * | 2/2004 | Lewallen ..................... 172/311 |
| 6,688,242 B2 | 2/2004 | Meyer et al. |
| 6,935,254 B2 | 8/2005 | Ostrander et al. |
| 7,051,663 B2 | 5/2006 | Meyer et al. |
| 7,438,137 B2 * | 10/2008 | Pederson et al. ............. 172/311 |
| 2003/0084829 A1 | 5/2003 | Lempriere |
| 2004/0187755 A1 | 9/2004 | Memory |
| 2004/0255774 A1 | 12/2004 | Hill |
| 2006/0243179 A1 | 11/2006 | Landphair et al. |
| 2007/0056755 A1 * | 3/2007 | Pederson et al. ............. 172/311 |

* cited by examiner

AGRICULTURAL IMPLEMENT WITH FLEXIBLE WING LOCKING SYSTEM

BACKGROUND

The present invention relates generally to the field of agricultural implements, such as planters and other wide, foldable implements towed behind a work vehicle, such as a tractor.

A wide range of farm implements have been developed and are presently in use for tilling, planting, harvesting, and so forth. Seeders or planters, for example, are commonly towed behind tractors and may cover wide swaths of ground which may be tilled or untilled. Such devices typically open the soil, dispense seeds in the opening, and reclose the soil in a single operation. Seeds are commonly dispensed from seed tanks and distributed to row units by a distribution system. To make the seeding operation as efficient as possible, very wide swaths may be covered by extending wings on either side of a central section of the implement pulled by the tractor. These wings are commonly disposed in a "floating" arrangement during the planting operation, wherein hydraulic cylinders allow the implement to contact the soil with sufficient force to open the soil, dispense the seeds and close the soil. For transport, the tool bar, including the wings may be rotated to reduce the width of the implement.

For wide implements incorporating wings of the type described above, servicing may be greatly facilitated by the ability to raise the wings to better access row units attached to a tool bar on either side of the implement. Moreover, while the wings may generally "float" during planting, when the tool bar is raised, actuators maintain the wings in a raised position to avoid drooping or contact with the ground. Again, the wings are typically raised by hydraulic cylinders connected across a pivot joint. The wings may be left in a raised position for extended periods. While such operation does not normally pose difficulties, in certain situations the wings can slowly decline over longer period of time, such as overnight. There is a need, therefore, for improved techniques for controlling winged extensions on agricultural implements that avoids the inadvertent or undesirable lowering of the wings from raised positions.

BRIEF DESCRIPTION

The invention provides an innovative yet straightforward approach to controlling agricultural implements, particularly for maintaining winged extensions in desired elevated positions. The invention may be used in a wide range of settings, but is particularly well-suited to implements such as seeders, planters, discs, plows, and so forth in which winged extensions can be raised and lowered by automatic mechanisms, such as hydraulic circuits. In one particular embodiment, for example, the invention may provide a mechanical link which can be fitted to attachment points on either side of a hinged connection between portions of the implement, typically between a central portion and a wing extension. The link may include one or more tension members which can be fitted to pins or other attachment points. The pins may extend from points where hydraulic cylinders are attached, such as clevis pins, trunnion pins, and so forth. Other specific attachment points may, of course, be provided. The tension members may be completely removable or may be resident on the implement and may be simply moved to stowed positions when not needed. The invention may be easily retrofitted to existing implements to allow for more securely holding winged extensions in elevated positions, removing stress and strain from actuators, such as hydraulic cylinders.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1A:
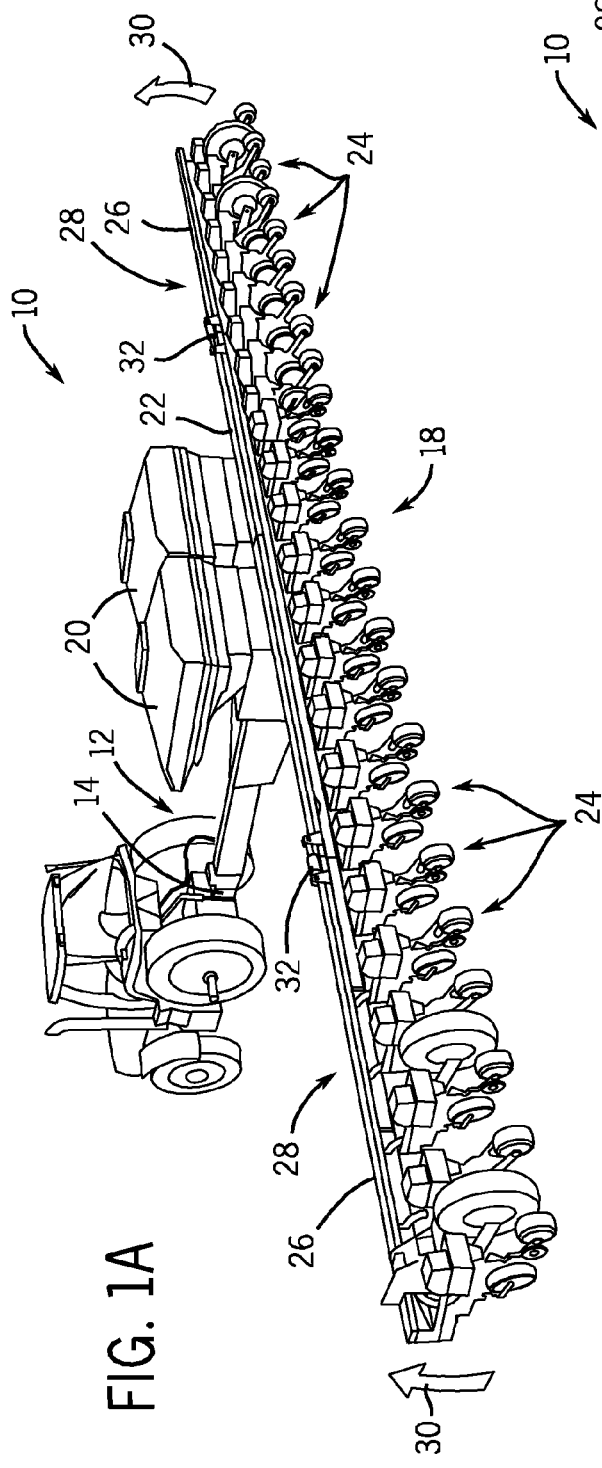
FIGS. 1A through 1C are rear perspective views of an agricultural implement, in this case a planter, having a central portion and winged extensions that can be raised and lowered by appropriate actuators and maintained in raised positions by means of the invention, the figures showing the implement in a lowered position, and in raised positions in preparation for road transport and storage.
Figure 1B:
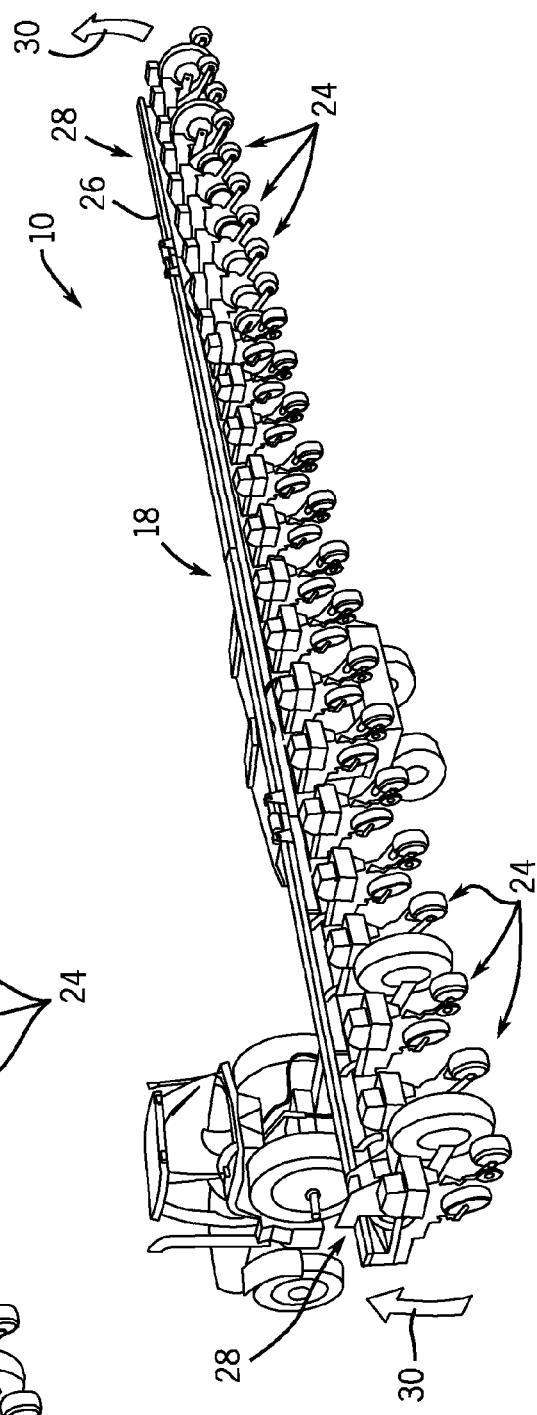
Figure 1C:
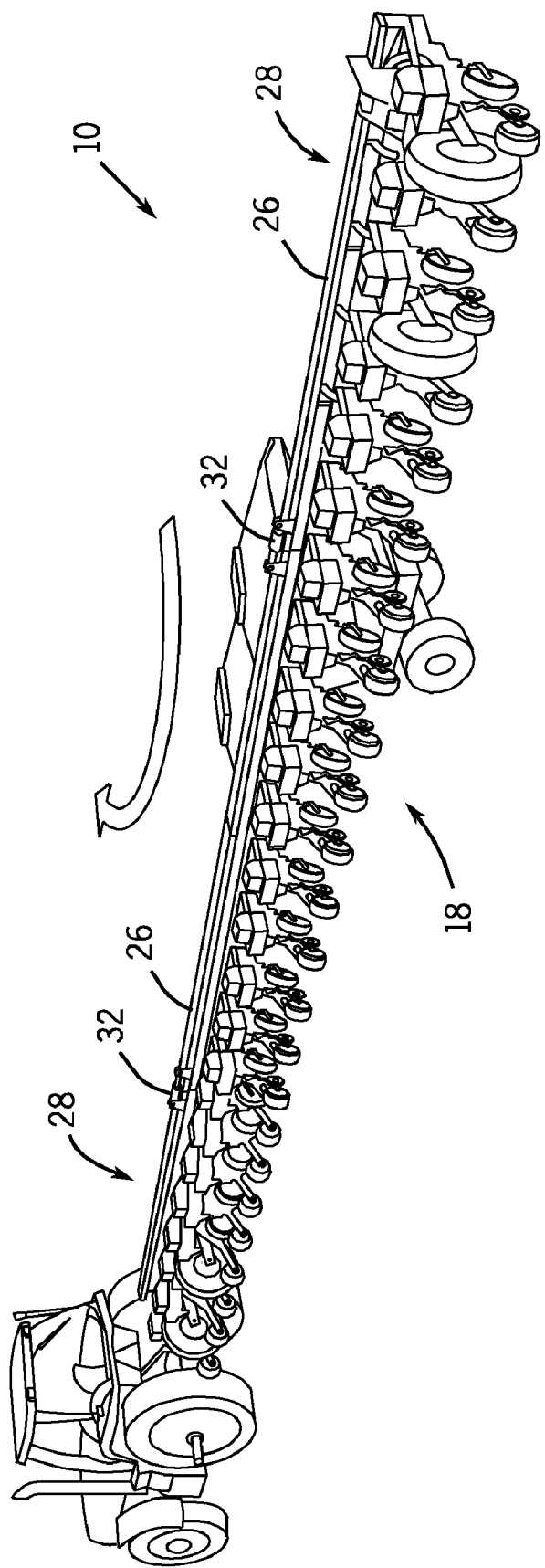

Turning now to the drawings, and referring first to FIGS. 1A through 1C, an implement 10 is illustrated in the form of a planter. The implement is designed to be towed behind a work vehicle, such as a tractor. The implement is built on a frame 12 which includes a fore-end-aft tow bar 14. The working implement itself includes a central portion 18 on which the frame provides support for seed tanks 20 (or other equipment or tanks that may be mounted to the implement). A tool bar 22 extends transversely with respect to the tow bar 14, and the seed tanks are generally supported above the central portion of the tool bar 22 on the frame. Other types of implements will, of course, not include such seed tanks.

In the case of the planter illustrated in FIG. 1A, the tool bar supports row units 24 designed to dispense seeds along parallel rows and at a desired spacing in a field. Depending upon the design of the row units and upon such factors of the nature of the field (e.g., tilled or untilled), each row unit may serve a variety of functions and may have structures designed for these functions. Such structures may include, for example, an opening disc, a metering system, a covering disc, a firming wheel, a fertilizer dispenser, and so forth. Recipients or hoppers may be mounted on the framework of each row unit for receiving seeds, fertilizer or other materials to be dispensed by the row units. A distribution system, designated generally be reference numeral 26 in the figure, serves to communicate seeds from the seed tanks to the various row units.

The implement 10 includes wings 28, each having their own tool bar, on either side of the central portion 18. These wings may be elevated and lowered to assist in transport and to vary the pressure applied on the soil by the row units along the tool bar. Thus, the wings may be raised, as indicated by arrows 30 in FIGS. 1A and 1B, by bending at pivot points 32 where the wings join the tool bar of the central portion 18 of the implement. As will be appreciated by those skilled in the art, pressure is generally distributed between the row units and transport wheels located on the implement frame, visible in FIGS. 1B and 1C. The tool bar and row units may be raised with respect to these transport wheels to elevate the row units above road surfaces for transport.

In preparing the implement 10 for road transport and storage, the tow bar 14 is extended and the tool bar and row units are raised on the transport wheels, lifting the row units 24 from the ground, as shown in FIG. 1B. The wings 28 are held in an upwardly lifted position as shown. The entire tool bar, with the row units, may then be pivoted on the frame, as shown in FIG. 1C. The extent to which the tow bar is extended in this operation depends, of course, on the length of the wings 28. In general, the wings could be supported in this orientation by actuators used to raise and lower them. By way of example, the wings may typically be moved in a range of 15-20 degrees about the pivot joint that joins them to the central portion of the implement. The present invention, as described more fully below, allows for stress and strain to be removed from these actuators to prevent drooping or dropping of the wings during road transport and storage of the implement in the raised position. It should be noted that the invention may be used with the implement in the raised position of FIG. 1B (e.g., to facilitate access to and servicing of the row units), or in the transport position of FIG. 1C.

Figure 2:
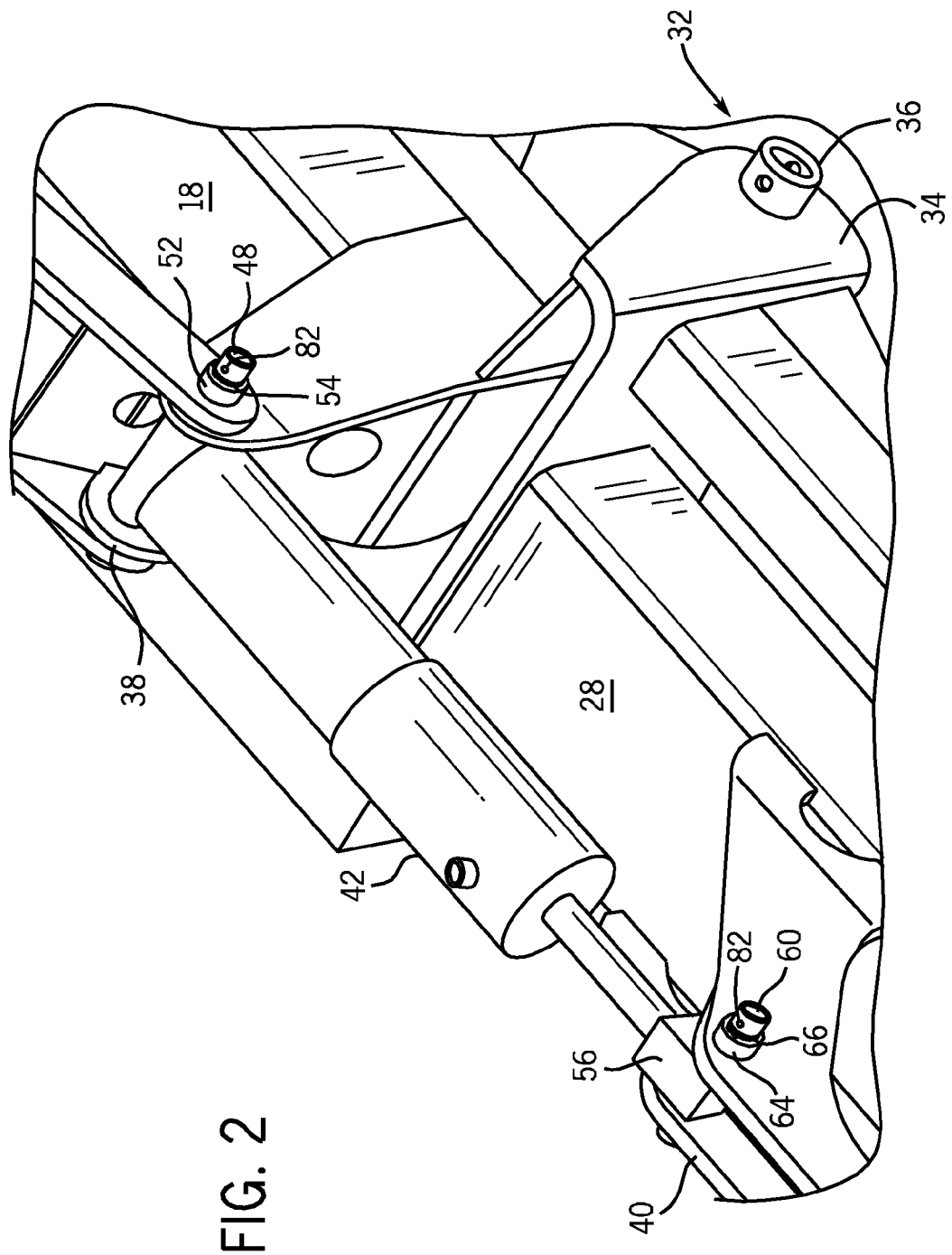
FIG. 2 is a perspective view of a pivot point the central portion of the implement of FIG. 1 and one of the winged extensions, illustrating an actuator for raising the wing as well as a tension member in accordance with the present invention for maintaining the wing in a raised position.

FIG. 2 illustrates exemplary components in a joint where the central portion 18 of the implement of FIGS. 1A through 1C is pivotally joined to one of the wings. The arrangement of FIG. 2 is specifically designed to allow for use of tension members to hold the wings in an elevated position as described below. As shown in FIG. 2, a bracket 34 is mounted on the central portion 18 adjacent to the pivot point 32. A pivot pin 36 is mounted through this bracket, to pivotally attach the wing 28 to the central portion 18. A clevis-type support 38 is mounted to an upper side of the central portion 18 and may be reinforced by struts, structural members, or other means, illustrated generally in FIG. 2 but not designated by reference numerals. A bracket 40 is mounted at a similar location on the wing 28. The support 38 and bracket 40 are designed to receive an actuator 42, in the illustrated embodiment, a hydraulic cylinder. The cylinder is forced to extend and retract by hydraulic fluid pressure from a hydraulic power unit (not illustrated in the figures). In the illustrated embodiment, the actuator 42 is a rear trunnion-mounted cylinder with a cap-end pivotally mounted in the support 38, and a rod end pivotally attached to the bracket 40.

Figure 3:
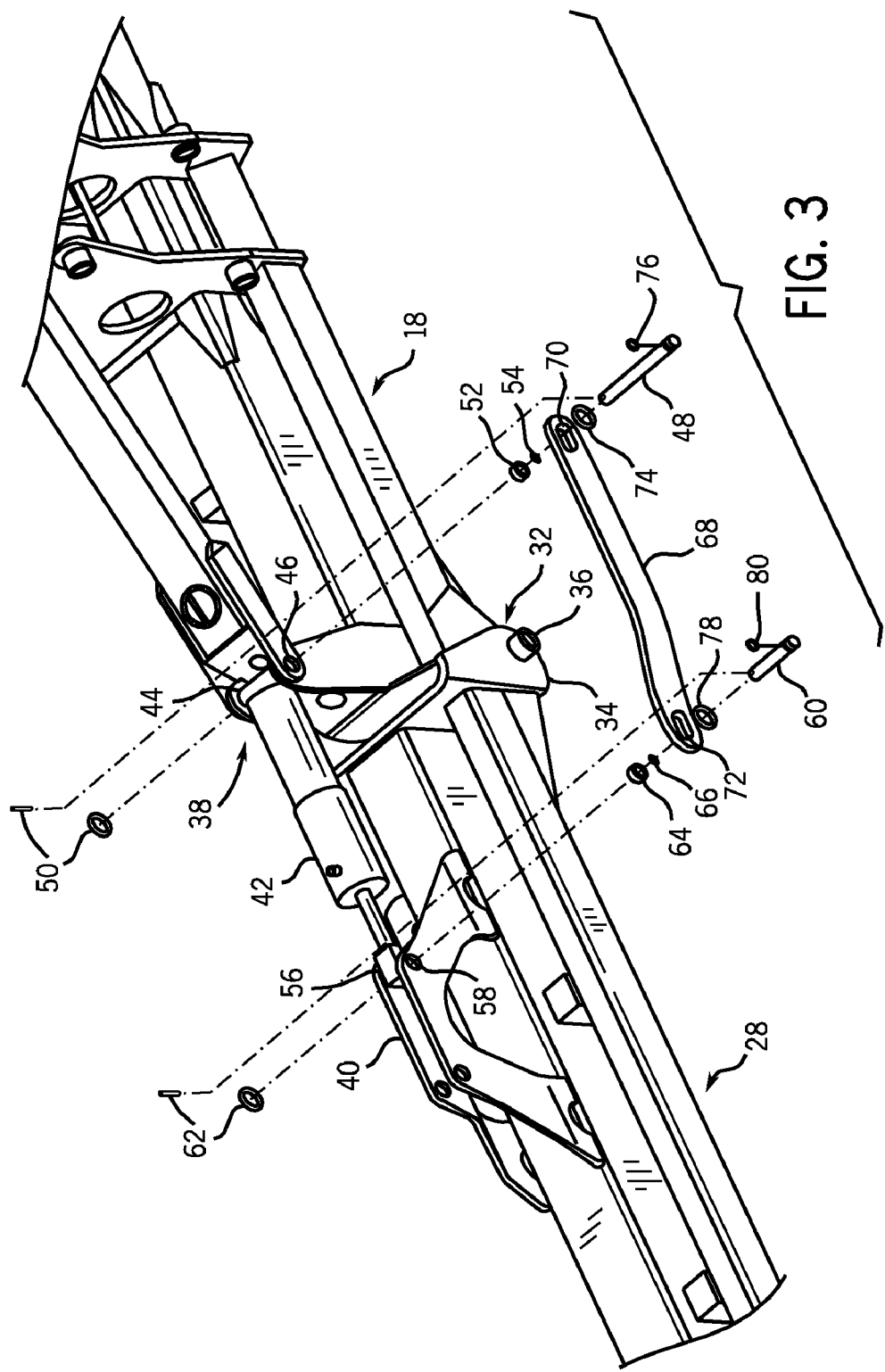
FIG. 3 is a partially exploded view of the pivot joint of FIG. 2 along with a tension member for supporting the wing of the implement in a raised position in accordance with the invention.

Referring to both FIG. 2 and the exploded view of FIG. 3, the trunnion 44 (see FIG. 3) of the actuator, along with the support 38, is provided with apertures or holes 46 configured to receive a pivot or a lynchpin 48. A retainer assembly 50 is secured to a rear-end of the pin, and may include a washer or a thrust member, along with a retaining pin. A bushing 52 is received on an opposite end of pin 48 and aids to distribute stress forces when the tension member is mounted as described more fully below. A further retaining member 54, such as a snap ring, is secured in a groove provided for this purpose in pin 48 to hold the bushing 52 in place, as well as the pin itself.

On the rod-end of the cylinder, a clevis or tang 56 is provided and an aperture in this tang, along with holes or apertures 58 in bracket 40 accommodate another pivot or lynchpin 60. A retainer assembly 62, which again may include a washer or a thrust member and a pin either received in or on the pin 60 on one side thereof, while a bushing 64 and retainer 60 are received on opposite end. Again, retainer 60 may comprise a snap ring that is received in a groove provided for this purpose in pin 60 to retain the bushing 64 in place, along with the pin itself.

The components, thus mounted, as illustrated in FIG. 2, will provide for pivotal movement of the wing with respect to the central portion of the implement, by extension and retraction of the actuator 42. As will be appreciated by those skilled in the art, retraction of the cylinder, in the embodiment illustrated, will cause the wing 28 to be raised. In present implementations, the wing may be raised several degrees, such as 5 to 10 degrees with respect to the central portion of the implement. The invention allows for strain to be removed from the actuator to hold the wing in such elevated positions for extended periods (overnight, or over a period of days).

In the embodiment illustrated in FIG. 3, a tension member 68, in the form of a metal (e.g., steel) plate, bar or strap, may be secured to the pivot pins for the actuator. The tension member 68 thus has an elongated slot 70 formed near one end thereof, and a similar slot 72 formed near an opposite end. The slots are dimensioned to permit the tension member to be placed over the bushings provided on the pins 48 and 60, respectively. The tension member may be held in place by washers 74 and 78, outboard of which retainers, cotter pins, quick-release pull pins, or the like may be secured, as indicated by reference numerals 76 and 80 in FIG. 3.

Figure 4:
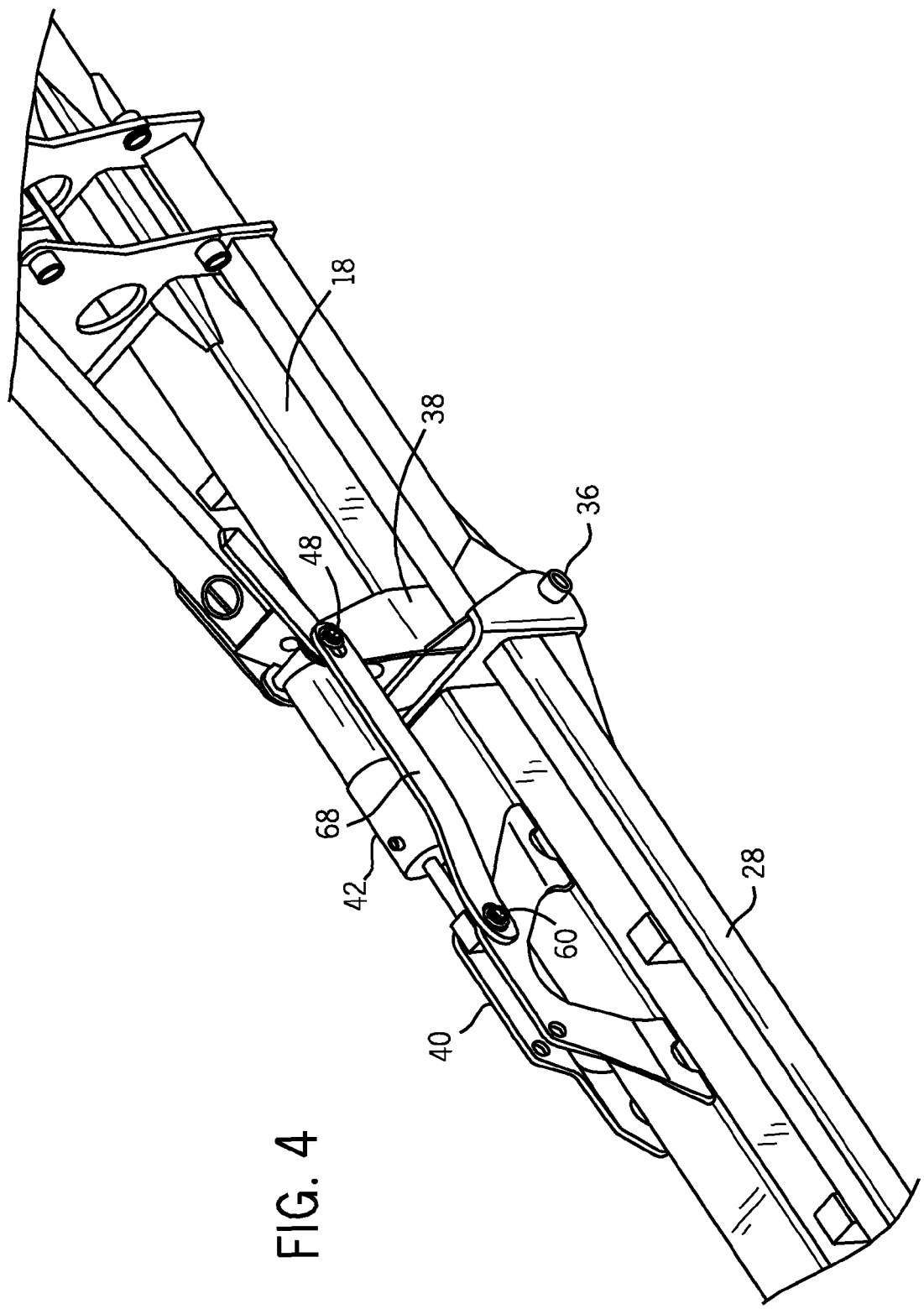
FIG. 4 is a perspective view of the same arrangement with the tension member secured in place.

FIG. 4 illustrates the tension member mounted on the joint shown in FIGS. 2 and 3. As indicated above, the wing 28 will be lifted with respect to the central portion 18 of the implement by retraction of the actuator 42. Such pivotal motion about the pivot pin 36 will cause the pins 48 and 60 to which the actuator is secured to approach one another, coming within range of the distance between the slots 70 and 72 of the tension member 68 (see FIG. 3). At this point, the slots may be fitted over the bushings mounted on the pins 48 and 60, and the retaining structures may be secured outboard of the tension member to hold the tension member in place and prevent it from slipping or being forced off of the pins. While round holes or apertures may be used in the tension member, the slotted apertures of the illustrated embodiment allow for some degree of freedom in the elevation required of the wing before the tension member can be fitted into place. Thereafter, pressure can be relieved from the actuator, without the wing descending, by virtue of abutment of the bushings against ends of the slots in the tension member. The bushings aid in distributing stress exerted by the wing on the tension member, and help to avoid damage to the lynchpins on which the actuator is mounted. Snap rings outboard of the bushings serve to retain the bushings, and the lynchpins themselves, in place and prevent the lynchpins from working loose during service. The use of separate pins to retain the tension member, then, allows for straightforward mounting and removal of the tension member when desired, without affecting the lynchpin or bushing mounting.

As will be appreciated by those skilled in the art, a number of variations may be envisaged for the arrangement described above. For example, a pair of tension members may be used, with one being fitted on either side of the actuator to provide redundancy. Similarly, the tension member may be designed for removal from the arrangement, as in the illustrated embodiment, or may remain resident with the implement. In the latter case, the tension member may be hooked or otherwise configured to be swung down on one or more pins by pivotal movement on one of the pins, or on an additional structure. Moreover, in alternative configurations, the tension member may be secured to other components of the tool bar, brackets, or other elements than the pins used to secure the actuator pivotally to the implement.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A towed agricultural implement comprising:
   a central assembly including a frame configured to be towed in operation, the frame supporting a tool bar and a plurality of ground-contacting units attached to the tool bar;
   a wing assembly pivotally coupled to a lateral end of the frame and including a plurality of ground-contacting units;
   a pivot joint joining the central assembly and the wing assembly;
   a first support mounted on the central assembly and including a first pair of flanges each having holes therethrough;
   a second support mounted on the wing assembly and including a second pair of flanges each having holes therethrough;
   an actuator spanning the joint and mounted to the first and second flanges by respective first and second pins received in the holes of the respective flanges, the actuator being controllable to raise and lower the wing assembly with respect to the central assembly, the first pin extending laterally beyond at least one of the first pair of flanges, the second pin extending laterally beyond at least one of the second pair of flanges; and
   a selectively attachable tension member comprising a first closed aperture securable to the extension of the first pin from outside of the first pair of flanges, and a second closed aperture securable to the extension of the second pin from outside of the second pair of flanges.

2. The implement of claim 1, wherein the ground-contacting units comprise row units configured to deposit seeds during operation.

3. The implement of claim 2, wherein the tension member holds the wing assembly in a position sufficiently elevated to raise the row units out of contact with the ground.

4. The implement of claim 3, comprising at least one seed tank supported on the central assembly and coupled to the row units by a seed distribution system.

5. The implement of claim 1, comprising locking members received in the pins to retain the tension member on the pins.

6. The implement of claim 1, wherein the first closed aperture and the second closed aperture permit mounting of the tension member within a range of angular positions of the wing assembly with respect to the central assembly.

7. The implement of claim 1, comprising bushings mounted on the extensions of the pins, the tension member being received on the bushings to distribute loading on the tension member.

8. The implement of claim 1, wherein the tension member comprises a metal bar having the first closed aperture and the second closed aperture.

9. A towed agricultural implement comprising:
   a central assembly including a frame configured to be towed in operation, the frame supporting a tool bar and a plurality of ground-contacting units attached to the tool bar;
   a wing assembly pivotally coupled to a lateral end of the frame and including a plurality of row units configured to deposit seeds during operation;
   a seed tank supported on the central assembly;
   a seed distribution operatively coupled to the seed tank and to the row units;
   a pivot joint joining the central assembly and the wing assembly;
   a first support mounted on the central assembly and including a first pair of flanges each having holes therethrough;
   a second support mounted on the wing assembly and including a second pair of flanges each having holes therethrough;
   an actuator spanning the joint and mounted to the first and second flanges by respective first and second pins received in the holes of the respective flanges, the actuator being controllable to raise and lower the wing assembly with respect to the central assembly, the first pin extending laterally beyond at least one of the first pair of flanges, the second pin extending laterally beyond at least one of the second pair of flanges;
   a selectively attachable tension member comprising a first closed aperture securable to the extension of the first pin from outside of the first pair of flanges, and a second closed aperture securable to the extension of the second pin from outside of the second pair of flanges; and
   means for securing the tension member onto the extensions of the first and second pins and for permitting the tension member to be removed from the first and second pins without removal of either the first or the second pins from the actuator and from the first and second supports.

10. The implement of claim 9, wherein the tension member holds the wing assembly in a position sufficiently elevated to raise the row units out of contact with the ground.

11. The implement of claim 9, wherein the means for securing the tension member onto the extensions of the first and second pins comprises locking members received in the pins.

12. The implement of claim 9, wherein the first closed aperture and the second closed aperture permit mounting of the tension member within a range of angular positions of the wing assembly with respect to the central assembly.

13. The implement of claim 9, comprising bushings mounted on the extensions of the pins, the tension member being received on the bushings to distribute loading on the tension member.

14. The implement of claim 9, wherein the tension member comprises a metal bar having the first closed aperture and the second closed aperture.

15. A towed agricultural implement comprising:
   a central assembly including a frame configured to be towed in operation, the frame supporting a tool bar and a plurality of ground-contacting units attached to the tool bar;
   a wing assembly pivotally coupled to a lateral end of the frame and including a plurality of ground-contacting units;
   a pivot joint joining the central assembly and the wing assembly;
   a first support mounted on the central assembly and including a first pair of flanges each having holes therethrough;
   a second support mounted on the wing assembly and including a second pair of flanges each having holes therethrough;
   an actuator spanning the joint and mounted to the first and second flanges by respective first and second pins received in the holes of the respective flanges, the actuator being controllable to raise and lower the wing assembly with respect to the central assembly, the first pin extending laterally beyond at least one of the first pair of flanges, the second pin extending laterally beyond at least one of the second pair of flanges;
   a selectively attachable tension member comprising a first closed aperture securable to the extension of the first pin from outside of the first pair of flanges, and a second closed aperture securable to the extension of the second pin from outside of the second pair of flanges; and means for securing the tension member onto the extensions of the first and second pins and for permitting the tension member to be removed from the first and second pins without removal of either the first or the second pins from the actuator and from the first and second supports.

16. The implement of claim 15, wherein the tension member holds the wing assembly in a position sufficiently elevated to raise the ground engaging units out of contact with the ground.

17. The implement of claim 15, wherein the means for securing the tension member onto the extensions of the first and second pins comprises locking members received in the pins.

18. The implement of claim 15, wherein the first closed aperture and the second closed aperture permit mounting of the tension member within a range of angular positions of the wing assembly with respect to the central assembly.

19. The implement of claim 15, comprising bushings mounted on the extensions of the pins, the tension member being received on the bushings to distribute loading on the tension member.

20. The implement of claim 15, wherein the tension member comprises a metal bar having the first closed aperture and the second closed aperture.

* * * * *